April 22, 1969
J. R. ORTON
3,439,478
METHOD OF HARVESTING GRAPES OR THE LIKE
Original Filed April 15, 1965
Sheet 1 of 2
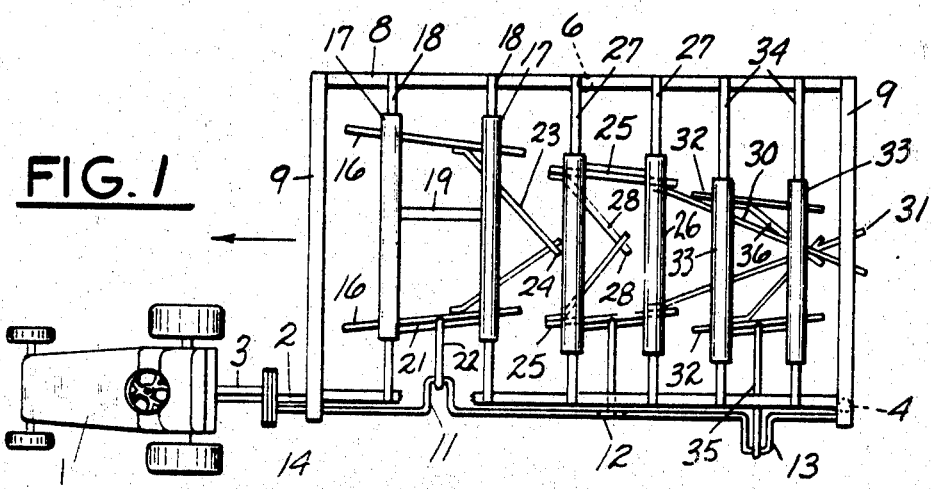
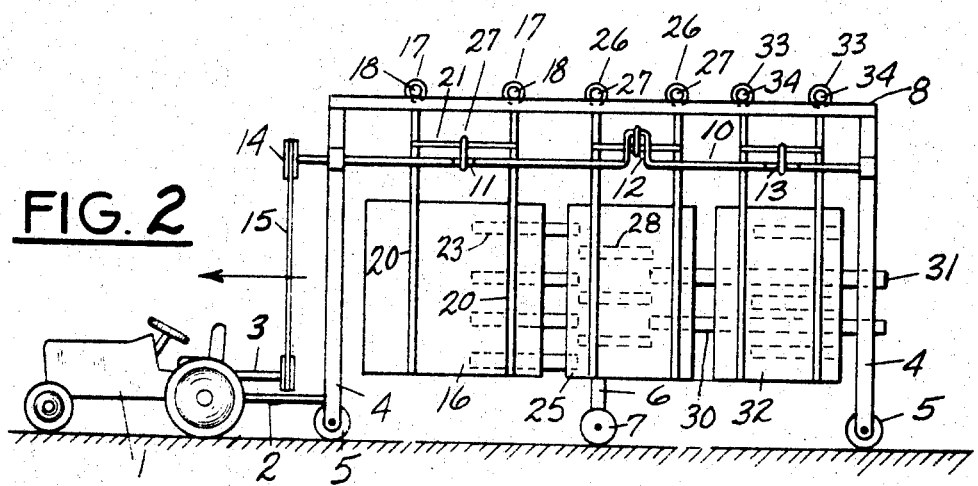
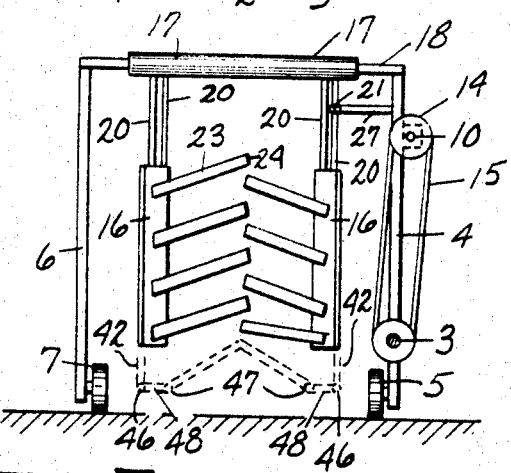
INVENTOR.
Joseph R. Orton
BY Sommer & Weber
Attorneys

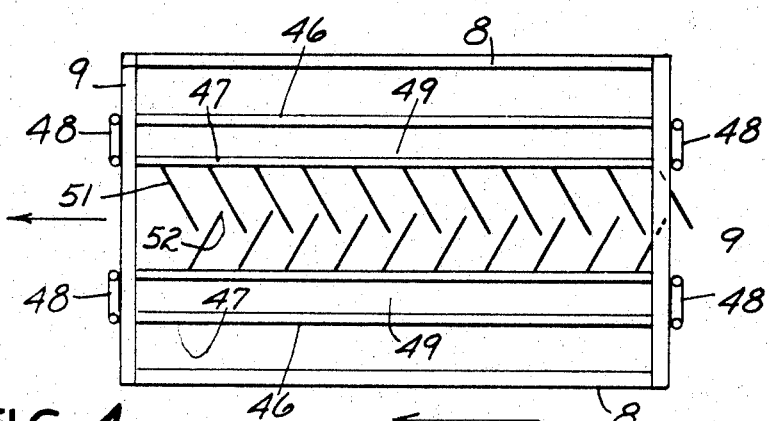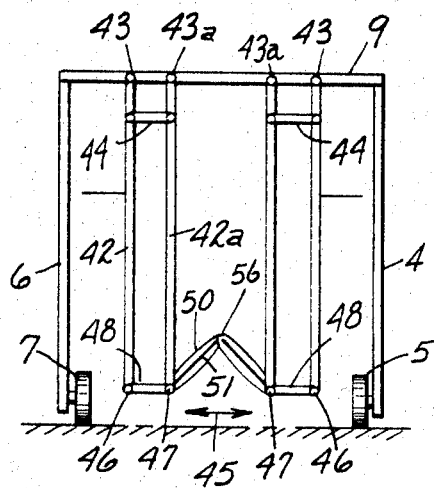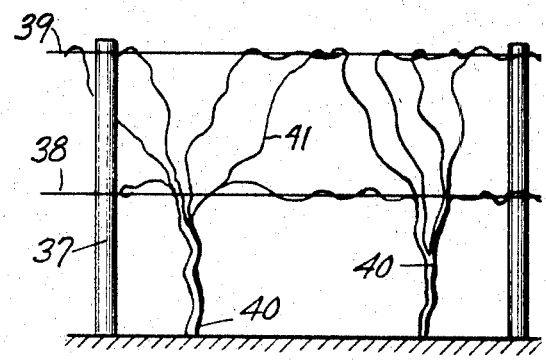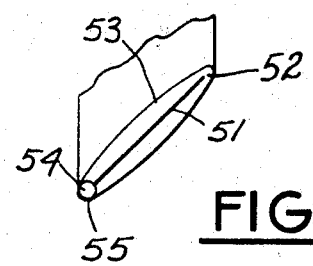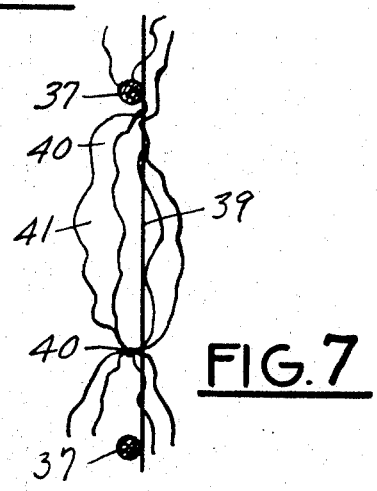

United States Patent Office

3,439,478
Patented Apr. 22, 1969

3,439,478
METHOD OF HARVESTING GRAPES OR THE LIKE
Joseph Roy Orton, Ripley, N.Y., assignor to Chisholm-Ryder Company, Inc., Niagara Falls, N.Y., a corporation of New York
Original application Apr. 15, 1965, Ser. No. 448,518. Divided and this application Feb. 29, 1968, Ser. No. 709,327
Int. Cl. A01g *19/00;* A01d *41/08, 91/00*
U.S. Cl. 56—1                                   8 Claims

ABSTRACT OF THE DISCLOSURE

The frame of the mobile harvester travels along opposite sides of a row of grapevines or the like trained on a trellis wire and on opposite sides of the row has groups of generally horizontal flexible bars extending lengthwise of the row and moved horizontally back and forth crosswise of the row and vertically positioned to engage and shake the top, bottom and intermediate part of the fruit bearing growth. The flexible bars have their trailing ends converging toward, and preferably crossing, each other at the center of the row to grip and shake the vines so that grapes at the center of the row are shaken free as well as the grapes growing along the outside of the row. Vertical side panels guide the grapes to bottom conveyors. Between the conveyors the falling grapes are guided onto the conveyors by rows of flexible bodied arms each row being covered by a flexible covering the edges of which, along the free ends of the flexible arms, meet at the center of the row of vines and forming a peak shedding the grapes onto the conveyors.

*Cross reference to related application*

This is a division of copending application Ser. No. 448,518 and now abandoned, filed. Apr. 15, 1965.

*Description of drawings*

In the drawing, FIG. 1 is a top plan view of a grape harvesting machine; FIG. 2 is a side elevation of the machine; FIG. 3 is an elevation of the front end of the machine looking backwards with respect to its direction of travel; FIG. 4 is a top plan view of the grape catcher; FIG. 5 is an end view of the grape catcher; FIG. 5a is a detail of the grape catcher; FIG. 6 is a side view of a row of grapevines; and FIG. 7 is a top view of the row of grapevines.

*Description of the preferred embodiment*

The grape harvesting machine conveniently may be drawn by a tractor 1 having a draw-bar 2 which pulls the machine and a power take-off shaft 3 which supplies power to the machine.

The machine has a frame which straddles the row of grapes to be harvested. The frame comprises longitudinally spaced uprights 4 on one side of the row supported by caster wheels 5 and an upright 6 on the opposite side of the row supported by a caster wheel 7. For side hill operation the casters may have leveling devices. At the upper ends, the the uprights 4 and 6 support a generally rectangular frame comprising longitudinal members 8 and cross members 9. Additional bracing is provided but is omitted for the purpose of clarity of illustration. The uprights 4 and 6 straddle the row of grapes being harvested and the top frame consisting of the longitudinal and cross members 8 and 9 rides above the top of the row.

Harvesting of the grapes is on the shaking principle, the power for the shaking being derived from a longitudinally extended crankshaft 10 suitably journalled in uprights 4 and having crank throws 11, 12 and 13 spaced 120 degrees apart. At the front end of the crankshaft 10 is a pulley 14 having a belt drive 15 from the power take-off shaft 3. By way of example, and not by way of limitation, the speed of the crankshaft may be of the order of 250 to 400 revolutions per minute and the stroke may be of the order of two to three inches.

As the harvesting machine is drawn along the row of grapes, the vines are in effect funneled between shakers which shake the vines with progressively increasing intensity so that when the shakers are finished, no grapes remain on the vines. The shakers crowd the grapevines toward the center of the row and accomplish the shaking with negligible damage to the vines.

At the front or entering end of the machine are vertical plates 16 suspended by a frame having slides 17 carried on crossbars 18 extending between the longitudinal frame members 8. The slides are connected by a cross brace 19 and have fixed thereto depending vertical frame members 20 fixed to the plates 16. Between the vertical members 20 is a cross member 21 connected by a connecting rod 22 to the crank throw 11. As shown in FIG. 1, the plates 16 are most widely separated at the entering or leading end and converge toward the exit or trailing end. Fixed to the trailing end of the plates 16 are a plurality of generally horizontal vertically spaced flexible bars 23 which converge at an acute angle toward the center of the row and preferably are slightly overlapped at their free or unsupported ends. 24. The bars 23 are preferably in staggered relation to each other. The purpose of the flexible bars 23 is to impart a shaking action to the grapevines without injuring the grapes. The shaker bars 23 shake the parts of the vines toward the center of the row. The free ends of the bars 23 project well between plates 25 similarly suspended from slides 26 on crossbars 27 extending between the longitudinal frame member 8. The plates 25 are likewise most widely separated at the leading ends and most closely separated at the trailing ends. Fixed to the inner sides of the plates 25 adjacent the leading edges are a plurality of sharply converging bars 28 each making an acute angle with the center of the row and each having free ends 29 in overlapping relation at the center of the plates 25. The bars 28 are flexible and are preferably in staggered relation to each other and to the bars 23 when viewed endwise of the row. Adjacent the trailing edges of the plates 25 are fixed a plurality of long shaker bars 30 having free or unsupported ends 31 overlapping and projecting beyond the trailing end of the machine. The shaker bars 30 extend at an acute angle to the center of the row between plates 32 fixed to slides 33 on crossbars 34 extending between the longitudinal frame members 8 and reciprocated by connecting rod 35 connected to crank throw 13. The plates 32 are the most closely spaced. The plates 32 carry flexible shaker bars 36 fixed to the leading edges of the plates and at an acute angle to the center of the row converging toward the trailing edges of the plates 32. The shaker bars 36 are preferably in staggered relation to each other and to the bars 30 so that each bar acts independently on a different portion of the grapevine. The free ends 36a preferably overlap in the same manner as the free ends of the bars 23, 28, 30.

As an example of dimensions, and not by way of limitation, the plates 16 may be approximately four feet by four feet converging from a lateral spacing of three feet at the entering or leading end to a spacing of two and one-half feet at the trailing end. The plates 25 may be two and one-half feet wide and four feet high converging from a spacing of substantially one and three-quarters feet at the entering end to a spacing of one and one-quarter feet at the trailing end. The plates 32 may be two and one-half feet wide converging from a spacing of one and one-half feet at the leading end to a spacing of three-quarters of a foot at the trailing end. All of the plates may conveniently be made of plywood. The shaker bars 23, 28 and 36 may have a length of substantially two feet and the shaker bars 30 may have a length of substantially five feet. The shaker bars may be made of wood suitably fixed at one end to the plates.

The operation may be best explained with reference to FIGS. 6 and 7 which show a typical row of grapes having posts 37, for example on twenty-four foot centers, carrying vine supporting wires 38 and 39 respectively three and six feet above the ground. On suitable spacing between the posts are grapevines 40 having new or bearing growth 41 primarily between the wires 38, 39 and of course bulging on opposite sides of the center line of the row. The average width of the grapevine at the time of harvest is approximately four feet. The grapevines are grown in standard rows so that the crossbars 9 clear the upper ends of the posts and the grape harvesting machine can be drawn along the row without interference. Substantially all of the fruit is in the region between the wires 38 and 39. As the harvesting machine is drawn along the row, the vines are first funneled between the machine and then subjected to a progressively vigorous shaking, dislodging the grapes without injuring the vines. The vines are gripped between the ends 24, 29, 31, 36a of the bars 23, 28, 30 and 36 which impart the shaking action. The sliding contact between the ends of the bars and the vines as the machine is drawn along the row continuously changes the grip without injury to the vines. The spacing of the plates is such that the posts 37 freely pass between the plates under any conditions. The flexibility of the shaker bars 23, 28, 30, 36 permits occasional contact with the posts 37 without injury. Because of the out of phase arrangement of the crank throws 11, 12 and 13, there is no dissipation of the shaking force due to swaying of the vines. The high speed shaking is advantageous. The grapes which are shaken off the vines drop freely between the plates ahead of the shaker bars and are caught in catchers to be described which likewise are designed so as to pass freely along the row without interference. The bars do not knock individual bunches of grapes off the vines. The plates 16, 25, 32 intercept grapes thrown laterally of the row so all grapes fall onto the catchers.

The grape catchers are supported by a frame having uprights 42, 42a pivoted at 43, 43a on crossbars 9 and tied together by a cross link 44 so that the lower ends of the catcher may move laterally independently of each other in the direction of arrow 45 in order to follow the row. Other expedients for supporting the catchers for independent lateral movement with respect to the row may be used such as, for example, slides used to support the plates. The lower ends of the uprights 42 are connected to a frame comprising longitudinal bars 46 and 47 and crossbars 48. The frame 46-48 is supported slightly above the surface of the ground and carries a suitable horizontal floor or supporting surface 49 for receiving the grapes. The supporting surface 49 may be fixed to the frame 46-48 or it may be a conveyor belt suitably powered to deliver the grapes to one end of the frame.

The longitudinal frame members 47 carry a flexible peaked structure 50 on which most of the grapes initially land. The purpose of this structure is to deflect the grapes onto the adjoining surfaces 49 where the grapes may be delivered to suitable containers. A convenient structure comprises flexible steel teeth 51 fixed at one end to longitudinal member 47 and having free ends 52 substantially meeting or slightly overlapping at the center. As shown in FIG. 5, the teeth 51 incline upwardly to form a peak which sheds the grapes laterally. As shown in FIG. 4, the teeth incline rearwardly as regards the direction of travel of the harvesting machine so that upon encountering a grapevine 40 or a grape post 37, the teeth are free to yield and will snap back into place. Also, if the yielding of the teeth 51 is insufficient, each frame 42-49 may swing laterally to prevent damage to grapevines. The weight of each frame 42-49 ordinarily biases it toward the center of the row, but supplemental biasing means may be provided if necessary. The yielding of the teeth and of the catcher frames prevents damage to the grapevines and also prevents damage to the grape catching structure.

Each set of teeth as shown in FIG. 5a is covered with a flexible sheet 53 of suitable fabric or other flexible material which extends the full length of each side of the peaked structure 50 and provides a continuous sloped surface on which the grapes initially land. The covering 53 need only be attached at its edges 54, 55 to the longitudinal frame members 47 and be loosely looped over the flexible teeth 51 as shown in FIG. 5a. This permits individual movement of the teeth 51 with respect to each other without interfering with the integrity of the grape receiving surface provided by the cover 53. The cover 53 moves upwardly or outwardly as required by the movement of the underlying supporting teeth 51.

The peak 56 formed by the slanted supporting surfaces 53 is substantially below the wire 38 so that it does not encounter interference from the grapevines. The covering surfaces 53 are also low enough to avoid being struck by the plates 16, 25, 32.

As the machine moves along the row, the grapes shaken from the vines fall primarily on the inclined surfaces 53 and are deflected laterally to the horizontal receiving surfaces 49. Misalignment of the machine with respect to the grapevines is accommodated by independent bodily movement of the frames 42, 48 laterally relative to the crossbars 9 so that the grape catcher is substantially centered with respect to the vines. Local obstructions such as the trunks of the vines and the supporting posts are accommodated by flexing of the teeth 51 and by the independent movement of the frames 42-48.

What is claimed is:

1. The method of harvesting grapes from vines trained in rows which comprises gripping the vines at the center of the row between gripping means having flexible portions extending toward each other from outside the vines on opposite sides of the row into the foliage of the vines and engaging the vines at the center of the row while reciprocating the gripping means to shake the grapes from the vines and moving the gripping means along the row.

2. The method of claim 1 wherein another and similar gripping of the vines occurs at a longitudinally spaced interval along the row, and the gripping means effecting such longitudinally spaced gripping are reciprocated crosswise of the row out of phase with each other.

3. The method of claim 1 which includes the additional step of deflecting grapes shaken laterally outside the vines back toward the center of the row.

4. The method of claim 1 wherein at least another and similar gripping of the vines occurs at a vertically spaced interval.

5. The method of harvesting grapes or the like grown on plants arranged in a row, wherein the improvement comprises gripping a portion of the plants in said row from opposite sides by elements having flexible portions which converge longitudinally in one direction along the row and penetrate the foliage of the plant, shaking said elements while so gripping the plants, and moving said elements along the row in a direction opposite from said one direction while so gripping the plants and shaking said elements.

6. The method of harvesting grapes or the like grown on plants arranged in a row, wherein the improvement comprises pressing flexible means against one side of a portion of the plants in said row so as to penetrate the foliage of such plants at an acute angle to the longitudinal axis of said row, shaking said means while so pressed against the plants, and moving said means along the row in a direction away from the apex of said angle while so engaging the plants and shaking said means.

7. The method of harvesting grapes from vines supported by vertically spaced longitudinal wires extending between posts in a row which comprises gripping the vines at the center of the row by gripping means having yieldable portions penetrating the foliage of the vines from opposite sides of the row and diverging outwardly from the center of the row and longitudinally in one direction along the row to the outer sides of the row while reciprocating the gripping means crosswise of the row to shake the grapes from the vines, and moving the gripping means along the row in said one direction to produce a sliding engagement with the vines between the center and outer sides of the row and to successively change the grip on the vines at the center of the row.

8. The method of harvesting grapes from vines trained in rows which comprises gripping the vines at the center of the row between gripping means penetrating the foliage from opposite sides of the row, moving the gripping means along the row to produce a sliding contact with the vines and to successively change the grip on said vines at the center of the row, and shaking the gripping means to dislodge the grapes from the vines.

References Cited

UNITED STATES PATENTS

| | | |
|---|---|---|
| 2,447,122 | 8/1948 | Horst. |
| 3,126,692 | 3/1964 | Weygrandt et al. _____ 56—330 |
| 3,229,453 | 1/1966 | Harrett _____ 56—330 |
| 3,325,984 | 6/1967 | Christie et al. _____ 56—330 |
| 3,344,591 | 10/1967 | Christie et al. _____ 56—330 |

ANTONIO F. GUIDA, *Primary Examiner.*

P. A. RAZZANO, *Assistant Examiner.*